No. 896,090.

PATENTED AUG. 18, 1908.

W. DEVOLL.
CLOD PULVERIZER.
APPLICATION FILED MAY 13, 1907.

Witnesses
Geo. Le Guern
C. H. Griesbauer

Inventor
WESLEY DEVOLL
by H. B. Willson & Co
Attorneys

UNITED STATES PATENT OFFICE.

WESLEY DEVOLL, OF MEXICO, MISSOURI.

CLOD-PULVERIZER.

No. 896,090.　　　Specification of Letters Patent.　　　Patented Aug. 18, 1908.

Application filed May 13, 1907. Serial No. 373,286.

*To all whom it may concern:*

Be it known that I, WESLEY DEVOLL, a citizen of the United States, residing at Mexico, in the county of Audrain and State of Missouri, have invented certain new and useful Improvements in Clod-Pulverizers; and I do declare the following to be a full, clear, and exact description of the invention, such as will enable others skilled in the art to which it appertains to make and use the same.

My invention has relation to new and useful improvements in clod pulverizers, and has for its object the production of a simple, economical and efficient operating device of this character by means of which clods in a field may be thoroughly broken up and the ground put in condition for cultivation in an expeditious manner and with a minimum of labor.

With the foregoing and other objects in view which will appear as the nature of the invention is better understood, the invention consists in certain novel features of construction, combination and arrangement of parts as will be hereinafter fully described and claimed.

Figure 1:
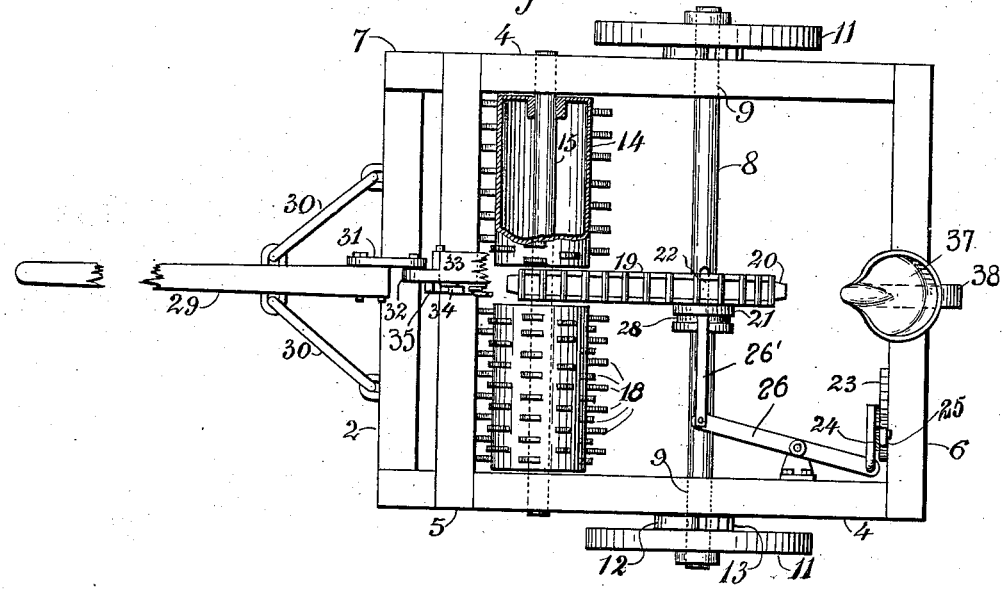
Figure 2:
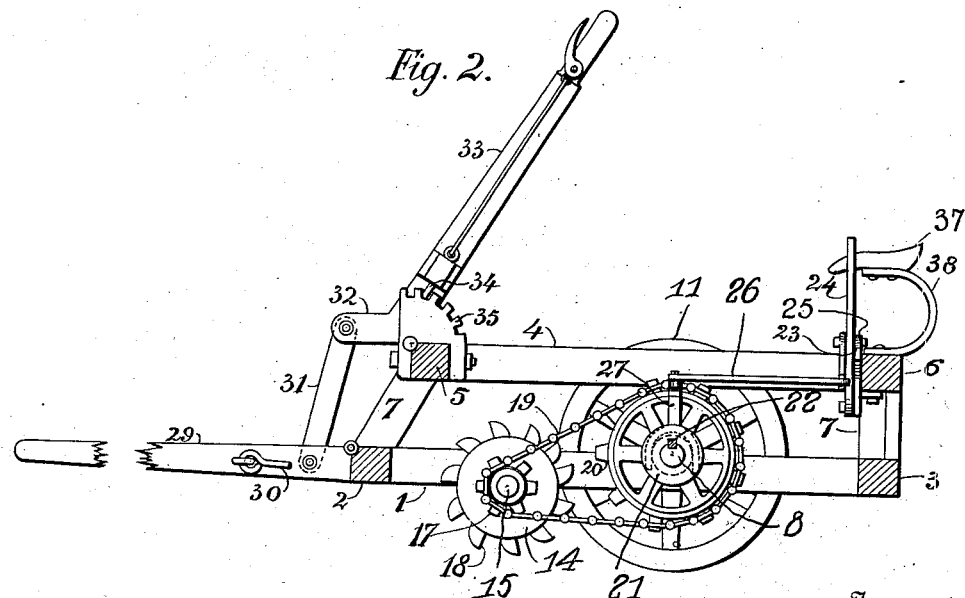

In the accompanying drawings, Figure 1 is a top plan view of the clod pulverizer; and Fig. 2 is a central longitudinal sectional view of the same.

My invention is composed of a lower frame comprising side beams 1 connected at their front and rear ends by front and rear cross-beams 2 and 3, respectively, and an upper frame shorter than the lower frame and comprising side beams 4 connected at their front and rear ends by front and rear cross-beams 5 and 6, respectively, said upper fame being secured a predetermined distance above and to said lower frame by supporting blocks 7 or other equivalent means.

The numeral 8 represents the main drive shaft which is arranged transversely of and is journaled in its ends in any suitable manner near the rear end of the lower frame.

The numeral 11 represents the supporting wheels which are loosely connected to the ends of said main or drive shaft 8 and are provided with pawls or blocks 12 adapted to be held in engagement with a ratchet 13 fixed to said drive shaft.

The numeral 14 represents two corresponding hollow cylinders which are rigidly fixed to an axle 15 journaled near its ends in any suitable manner to said lower frame forward of said main axle.

17 designates a small sprocket wheel which is keyed to said axle 15 between the inner ends of said hollow cylinder 14. Each of said cylinders is provided on its outer surfaces with a number of connecting blades 18 of suitable form which may be formed integral with or bolted or otherwise secured to said cylinder. In the application of my invention, said hollow cylinders 14 are put in rotation by means of a sprocket chain 19 working over said sprocket wheel 17 and over a larger drive sprocket wheel 20 slidably mounted on said main or drive shaft 8. Said drive wheel 20 may be thrown in and out of gear and said cylinders 14 thereby thrown in and out of operation by any suitable clutch mechanism and for the purpose of this specification I have shown and will describe a form of mechanism that may be employed for this purpose. Said drive wheel 20 is provided with a hub 21 having a longitudinal key-way 22 formed in its inner face and a corresponding key is formed on the outer surface of said drive shaft 8 to work in the key-way in said hub.

A segmental rack 23 is secured in any convenient manner to the frame at a point above or near one end of said drive shaft 8 and has pivoted to one face a lever 24 having a spring pawl 25 adapted to engage in the notches in said segmental rack. A longitudinally disposed bar 26 is pivoted at a suitable point between its ends to one of the side pieces of the upper frame, and is connected at its rear end to said lever. A transversely disposed bar or member 26' is connected at one end to the front end of the longitudinally disposed bar and terminates at its opposite end in a vertical arm 27 having a fork adapted to work in a groove 28 formed in the outer surface of the hub 21 of said drive wheel 20.

It will be apparent that by means of the above defined mechanism, the hub of said main drive shaft may be thrown in and out of engagement with said key on said main drive shaft, said hollow cylinders thereby being thrown in and out of operation.

The numeral 29 represents a draft tongue which is hinged at its inner end to the upper edge of the front of said cross-beam 2 of the lower frame and is provided with oblique members 30 connected at their front ends by suitable means and at their opposite or inner ends to said front cross-beam 2. A vertically-disposed connecting bar 31 is bolted or otherwise secured at its lower end at a suitable point near the inner end of said draft tongue 29 and is connected at its opposite or inner end to the lower integral end 32 of an oblique tilting lever 33 hinged to the upper edge of the front cross-beam 5 of said upper frame and provided at one of its side edges with a spring pawl 34 adapted to normally engage with a segmental rack 35 bolted or otherwise secured to the upper edge of said front cross-beam. The frame of the machine may be raised or lowered to suit the lay of the ground by adjusting the tilting lever at a suitable angle. A seat 37 having the usual seat bar 38 is secured to the rear cross-beam 6 of said upper frame. When my improved clod pulverizer is in use, said cutting blades 18 penetrate or cut into the ground a distance preferably of about one-half their length and when the machine is thrown out of gear said cutting blades may be raised above the ground by means of said tilting lever 33. Said main drive wheel 20 and said wheel 17 are of such relative sizes as to give said hollow cylinders 18 sufficient speed when the machine is in gear to thoroughly pulverize every clod within their reach.

Having thus described my invention, what I claim as new is:—

In a clod pulverizer, the combination with a lower frame, an upper frame vertically disposed thereabove and shorter than the lower frame, a shaft journaled upon the upper side of the lower frame, a rotary drum journaled in bearings on the lower frame forward of the shaft, and a driving connection between the shaft and drum, of a tongue pivoted to the lower frame, a segmental rack secured to the upper frame above the tongue and in the rear of the pivotal point, a lever pivoted to the tongue and having an integral foot, a link connected to the foot and to the tongue forward of the pivotal point whereby the frame may be lowered at its forward end to place the frame in engagement with the ground, or to raise it therefrom, and manual means to control the rotation of the drum.

In testimony whereof I have hereunto set my hand in presence of two subscribing witnesses.

WESLEY DEVOLL.

Witnesses:
T. J. WILLIAMS,
WALKER BURNS.